(12) United States Patent
Hapsari et al.

(10) Patent No.: US 8,867,387 B2
(45) Date of Patent: Oct. 21, 2014

(54) MOBILE COMMUNICATION SYSTEM AND TRANSMISSION-SIDE NODE

(75) Inventors: Wuri Andarmawanti Hapsari, Yokosuka (JP); Masayuki Motegi, Yokohama (JP); Masahiro Yamato, Yokosuka (JP); Yoshitsugu Shimazu, Kawasaki (JP)

(73) Assignee: NTT DoCoMo, Inc., Tokyo (JP)

( * ) Notice: Subject to any disclaimer, the term of this patent is extended or adjusted under 35 U.S.C. 154(b) by 784 days.

(21) Appl. No.: 13/122,351

(22) PCT Filed: Oct. 1, 2009

(86) PCT No.: PCT/JP2009/067184
§ 371 (c)(1),
(2), (4) Date: Jul. 14, 2011

(87) PCT Pub. No.: WO2010/038838
PCT Pub. Date: Apr. 8, 2010

(65) Prior Publication Data
US 2011/0261758 A1    Oct. 27, 2011

(30) Foreign Application Priority Data
Oct. 1, 2008    (JP) ................. 2008-256681

(51) Int. Cl.
*G06F 11/00*       (2006.01)
*H04L 12/875*      (2013.01)
*H04L 12/851*      (2013.01)
*H04L 29/06*       (2006.01)
*H04L 12/801*      (2013.01)
*H04W 80/08*       (2009.01)

(52) U.S. Cl.
CPC ............ *H04L 65/608* (2013.01); *H04W 80/08* (2013.01); *H04L 47/564* (2013.01); *H04L 47/24* (2013.01); *H04L 47/14* (2013.01)
USPC ......................................... 370/252; 370/231

(58) Field of Classification Search
CPC ..... H04L 43/00; H04L 43/022; H04L 43/024; H04L 43/04; H04L 43/08; H04L 43/0805; H04L 43/0811; H04L 43/0817; H04W 24/00; H04W 24/02; H04W 24/06; H04W 24/08; H04W 24/10; H04W 28/00; H04W 28/02; H04W 28/0205; H04W 28/021; H04W 28/0231; H04W 28/0236; H04W 28/0242
USPC ................. 370/231, 242, 252, 336, 338, 389, 370/395.52, 428, 468, 474
See application file for complete search history.

(56) References Cited

U.S. PATENT DOCUMENTS

2006/0193295 A1* 8/2006 White et al. ................... 370/336
2006/0221840 A1* 10/2006 Yasuoka et al. ............... 370/242
2008/0304490 A1* 12/2008 Bunn et al. ................ 370/395.52

FOREIGN PATENT DOCUMENTS

JP    2005-529552 A    9/2005
WO    03/105438 A1    12/2003

OTHER PUBLICATIONS

H. Matsuoka et al., "End-to-end-gata IP Soft Hand Over," The IEICE Translations on Communications, vol. J86-B, No. 8, Aug. 1, 2003, pp. 1369 to 1378, with translation of section 3.1, 'Multihoming,' 13 pages.

(Continued)

*Primary Examiner* — Habte Mered
*Assistant Examiner* — Prince A Mensah
(74) *Attorney, Agent, or Firm* — Osha Liang LLP

(57) ABSTRACT

In a mobile communication system according to the present invention, an AP/ULP layer of a transmission-side node (A) is configured to acquire, from a SCTP layer of the transmission-side node (A), a "rwnd" for each connection of the SCTP layer, a "cwnd" for each physical path, and a third data amount indicating an amount of data transmitted within a unit time by the transmission-side node (A) for each stream; and when an urgency flag is included in data subject to transmission, the AP/ULP layer of the transmission-side node (A) is configured to determine a stream and a physical path through which the data subject to transmission should be transmitted, based on the "rwnd", the "cwnd", and the third data amount, and to notify, to the SCTP layer, the determination.

10 Claims, 4 Drawing Sheets

(56) References Cited

OTHER PUBLICATIONS

3GPP TS 36.412 V10.0.0, Dec. 2010, "3rd Generation Partnership Project; Technical Specification Group Radio Access Network; Evolved Universal Terrestrial Radio Access Network (E-UTRAN); S1 signalling transport (Release 10)," 9 pages.
3GPP TS 36.422 V10.0.0, Dec. 2010, "3rd Generation Partnership Project; Technical Specification Group Radio Access Network; Evolved Universal Terrestrial Radio Access Network (E-UTRAN); X2 signalling transport (Release 10)," 8 pages.
International Search Report issued in PCT/JP2009/067184, mailed Oct. 27, 2009, with translation, 3 pages.
Written Opinion issued in PCT/JP2009/067184, mailed Oct. 27, 2009, with translation, 7 pages.
International Preliminary Report on Patentability issued in PCT/JP2009/067184, on May 10, 2011, with translation, 8 pages.

* cited by examiner

AP:Application Protocol
ULP:Upper Layer Protocol
SCTP:Stream Control Transmission Protcol

AP LAYER

ULP LAYER

- rwnd
- cwnd
- AMOUNT OF DATA FORWARDED IN UNIT TIME

SCTP LAYER

AP LAYER

ULP LAYER  SEND(association ID, buffer address, byte count[,context][, stream id][,life time][,destination transport address][, unordered flag][,no bundle flag][,PPI])

BUFFER CONTROL

SCTP LAYER

MOBILE COMMUNICATION SYSTEM AND TRANSMISSION-SIDE NODE

TECHNICAL FIELD

The present invention relates to a mobile communication system configured in which a communication is configured to be performed between a reception-side node and a transmission-side node by a first protocol layer, a second protocol layer that is a lower layer of the first protocol layer, and a third protocol layer that is a lower layer of the second protocol, and relates also to a transmission-side node.

BACKGROUND ART

In a mobile communication system of the LTE (Long Term Evolution) scheme, a communication is configured to be performed by an SCTP (Stream Control Transmission Protocol) layer between a reception-side node and a transmission-side node.

SUMMARY OF THE INVENTION

Problems to be Solved by the Invention

However, there is a problem that in reality, when a communication service is provided in the mobile communication system of the LTE scheme, it is needed to preferentially process a message that requires urgency to other communications even in a layer controlling a stream and an IP pass (physical pass) in an SCTP layer, however, at this moment, how a preferential process of the message that requires urgency is realized has not been thought of.

Therefore, the present invention is intended to overcome the above-described problem. An object of the present invention is to provide a mobile communication system capable of preferentially processing a message that requires urgency to other communications in a layer controlling a stream and an IP pass (physical pass), and also to provide a transmission-side node.

Means for Solving the Problem

A first aspect of the present invention is summarized as a mobile communication system in which a communication is configured to be performed between a reception-side node and a transmission-side node by a first protocol layer and a second protocol layer that is a lower layer of the first protocol layer; wherein the transmission-side node includes one or a plurality of transmission-side IP addresses; the reception-side node includes one or a plurality of reception-side IP addresses; a connection of the second protocol layer formed by a plurality of physical path is configured to be set between the transmission-side node and the reception-side node; the plurality of physical paths are configured to be set by each of the transmission-side IP addresses and each of the reception-side IP addresses; one or a plurality of streams are configured to be set within the connection of the second protocol layer set between the transmission-side node and the reception-side node; the first protocol layer of the transmission-side node is configured to acquire, from the second protocol layer of the transmission-side node, a first data amount indicting an amount of data that can be received at the reception-side node for each connection of the second protocol layer, a second data amount indicating an amount of data that can be transmitted by the transmission-side node for each physical path, and a third data amount indicating an amount of data transmitted within a unit time by the transmission-side node for each stream; and when an urgency flag is included in data subject to transmission, the first protocol layer of the transmission-side node is configured to determine a stream and a physical path through which the data subject to transmission should be transmitted, based on the first data amount, the second data amount, and the third data amount, and to notify, to the second protocol layer of the transmission-side node, the determination.

In the first aspect of the present invention, one primary path can be configured to be set in the plurality of physical paths included in each of the connections of the second protocol layer; the first protocol layer of the transmission-side node can be configured to acquire a fourth data amount indicating an amount of data which has been transmitted through each of the physical paths but of which the transmission confirmation information has not been yet received; and when the amount of the data subject to transmission is smaller than a value obtained by subtracting the fourth data amount from the second data amount in the primary path, the first protocol layer of the transmission-side node can be configured to search a stream having the smallest third data amount, number of times of re-transmissions, or amount to be retained in a transmission buffer, to determine the searched stream and primary path as the stream and the physical path through which the data subject to transmission should be transmitted, and to notify, to the second protocol layer of the transmission-side node, the determination.

In the first aspect of the present invention, when the amount of the data subject to transmission is not smaller than a value obtained by subtracting the fourth data amount from the second data amount in the primary path, the first protocol layer of the transmission-side node can be configured to search a physical path in which the amount of the data subject to transmission is smaller than a value obtained by subtracting the fourth data amount from the second data amount, and to search a stream having the smallest third data amount, number of times of re-transmissions, or amount to be retained in a transmission buffer; and the first protocol layer of the transmission-side node can be configured to determine the searched stream and physical path as the stream and the physical path through which the data subject to transmission should be transmitted, and to notify, to the second protocol layer, the determination.

In the first aspect of the present invention, when an urgency flag is included in the data subject to transmission, the first protocol layer of the transmission-side node can be configured to determine a survival time of the data subject to transmission, together with the stream and the physical path through which the data subject to transmission should be transmitted, based on the first data amount, the second data amount, and the third data amount, and to notify, to the second protocol layer, the determination.

In the first aspect of the present invention, the second protocol layer of the transmission-side node can be configured to preferentially transmit data subject to transmission having the shortest survival time, out of the data subject to transmission received from the first protocol layer of the transmission-side node.

A second aspect of the present invention is summarized as a transmission-side node in which a communication is configured to be performed between the transmission-side node and a reception-side node having one or a plurality of reception-side IP addresses by a first protocol layer and a second protocol layer that is a lower layer of the first protocol layer; wherein the transmission-side node includes one or a plurality of transmission-side IP addresses; a connection of the second protocol layer formed by a plurality of physical paths is configured to be set between the transmission-side node and the reception-side node; the plurality of physical paths are configured to be set by each of the transmission-side IP addresses and each of the reception-side IP addresses; one or a plurality of streams are configured to be set within the connection of the second protocol layer; the first protocol layer is configured to acquire, from the second protocol layer, a first data amount indicting an amount of data that can be received at the reception-side node for each connection of the second protocol layer, a second data amount indicating an amount of data that can be transmitted by the transmission-side node for each physical path, and a third data amount indicating an amount of data transmitted within a unit time by the transmission-side node for each stream; and when an urgency flag is included in data subject to transmission, the first protocol layer is configured to determine a stream and a physical path through which the data subject to transmission should be transmitted, based on the first data amount, the second data amount, and the third data amount, and to notify, to the second protocol layer of the transmission-side node, the determination.

In the second aspect of the present invention, one primary path can be configured to be set in the plurality of physical paths included in each of the connections of the second protocol layer; the first protocol layer can be configured to acquire a fourth data amount indicating an amount of data which has been transmitted through each of the physical paths but of which the transmission confirmation information has not been yet received; and when the amount of the data subject to transmission is smaller than a value obtained by subtracting the fourth data amount from the second data amount in the primary path, the first protocol layer can be configured to search, within the primary path, a stream having the smallest third data amount, number of times of re-transmissions, or amount to be retained in a transmission buffer, to determine the searched stream and primary path as the stream and the physical path through which the data subject to transmission should be transmitted, and to notify, to the second protocol layer, the determination.

In the second aspect of the present invention, when the amount of the data subject to transmission is not smaller than a value obtained by subtracting the fourth data amount from the second data amount in the primary path, the first protocol layer can be configured to search a physical path in which the amount of the data subject to transmission is smaller than a value obtained by subtracting the fourth data amount from the second data amount, and to search a stream having the smallest third data amount, number of times of re-transmissions, or amount to be retained in a transmission buffer; and the first protocol layer can be configured to determine the searched stream and physical path as the stream and the physical path through which the data subject to transmission should be transmitted, and to notify, to the second protocol layer, the determination.

In the second aspect of the present invention, when an urgency flag is included in the data subject to transmission, the first protocol layer can be configured to determine a survival time of the data subject to transmission, together with the stream and the physical path through which the data subject to transmission should be transmitted, based on the first data amount, the second data amount, and the third data amount, and to notify, to the second protocol layer, the determination.

In the second aspect of the present invention, the second protocol layer can be configured to preferentially transmit data subject to transmission having the shortest survival time, out of the data subject to transmission received from the first protocol layer.

Effect of the Invention

As explained above, according to the present invention, it is possible to provide a mobile communication system capable of preferentially processing a message that requires urgency to other communications in a layer controlling a stream and to provide a transmission-side node.

BEST MODES FOR CARRYING OUT THE INVENTION (Configuration of Mobile Communication System According to First Embodiment of the Present Invention)

With reference to FIG. 1 to FIG. 5, the configuration of a mobile communication system according to a first embodiment of the present invention will be explained. In this embodiment, a mobile communication system of the LTE scheme will be illustrated as an example of the mobile communication system according to this embodiment; however, the present invention can be applied to mobile communication systems other than the LTE scheme.

Figure 1:
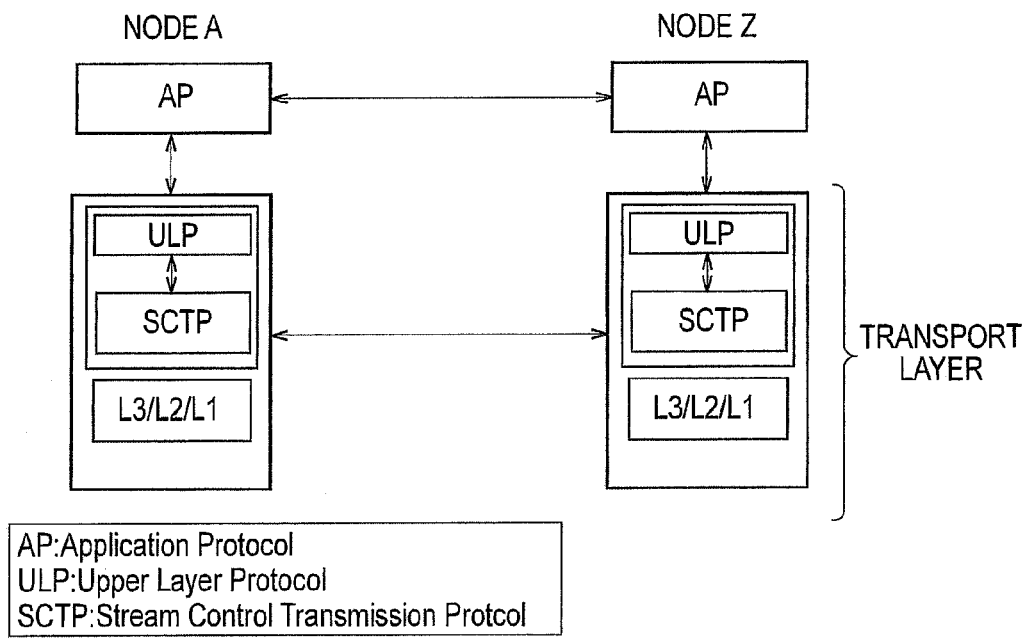
FIG. 1 is a diagram illustrating a protocol stack of each node in a mobile communication system according to a first embodiment of the present invention.

As illustrated in FIG. 1, the mobile communication system according to the embodiment in which a communication is configured to be performed between a reception-side node (end point) Z and a transmission-side node (end point) A by an AP (Application Protocol) layer (first protocol layer), a ULP (Upper Layer) layer (second protocol layer) that is a lower layer of the AP layer, and an SCTP layer (third protocol layer) that is a lower layer of the ULP layer.

In this case, at least one of the reception-side node (end point) Z and the transmission-side node (end point) A, the AP layer and the ULP layer may be mounted as a single layer.

That is, in the mobile communication system according to this embodiment, the communication may be configured to be performed between the reception-side node (end point) Z and the transmission-side node (end point) A, by an AP/ULP layer (first protocol layer) and an SCTP layer (second protocol layer) that is a lower layer of the AP/ULP layer.

When the transmission-side node A and the reception-side node Z are combined, the radio base stations eNB may be combined, or the radio base station eNB and the mobile switching center MME may be combined.

Figure 2:
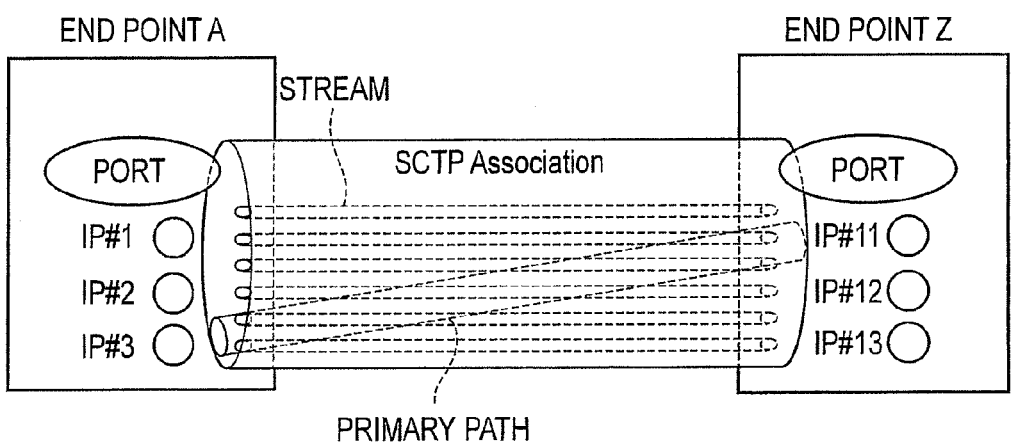
FIG. 2 is a diagram explaining an "SCTP Association" used in the mobile communication system according to the first embodiment of the present invention.

In the embodiment, an "SCTP Association (connection of a third protocol layer)" is configured to be set between the transmission-side node A and the reception-side node Z, as illustrated in FIG. 2.

In this case, when the "Multihoming" is applied, the transmission-side node A can include one or a plurality of transmission-side IP addresses (Source IP Addresses) and the reception-side node Z can include one or a plurality of reception-side IP addresses (Destination IP Addresses).

In an example of FIG. 2, the transmission-side node A includes a plurality of transmission-side IP addresses IP #1 to #3, and the reception-side node Z includes a plurality of transmission-side IP addresses IP #11 to #13.

Therefore, when the above-described "Multihoming" is applied, that is, when the transmission-side node A and the reception-side node Z include a plurality of IP addresses, respectively, it is possible to perform communication by using a plurality of IP addresses in a single "SCTP Association", that is, it is possible to set a plurality of physical paths.

In this case, the plurality of physical paths are configured to be set by each of the transmission-side IP addresses (IP #1 to #3) and each of the reception-side IP addresses (IP #11 to #13).

Moreover, when the "Multihoming" is set, a primary path used by default, out of a plurality of physical paths forming each "SCTP Association", is configured to be determined.

Further, one or a plurality of streams are configured to be set within the "SCTP Association" set between the transmission-side node A and the reception-side node Z.

Figure 3:
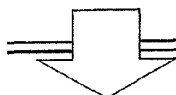
FIG. 3 is a diagram illustrating information transmitted from an SCTP layer of each node to a ULP layer in the mobile communication system according to the first embodiment of the present invention.
Figure 3:
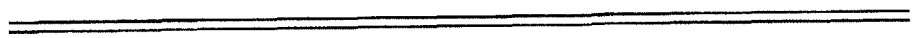

As illustrated in FIG. 3, the ULP layer of the transmission-side node A is configured to acquire: a "rwnd (receive window, a first data amount)" for each "SCTP Association"; a "cwnd (congestion window, a second data amount)" for each physical path; and an "amount of data transmitted in a unit time (a third data amount)" for each stream, from the SCTP layer of the transmission-side node A.

In this case, the "rwnd" for each "SCTP Association" indicates an amount of data that can receive at the reception-side node Z for each "SCTP Association".

The "cwnd" for each physical path indicates an amount of data that can be transmitted by the transmission-side node A for each physical path.

The "amount of data transmitted in a unit time" for each stream indicates an amount of data transmitted within a unit time by the transmission-side node A for each stream.

When an urgency flag is included in data subject to transmission received from the AP layer of the transmission-side node A, the ULP layer of the transmission-side node A is configured to determine the stream and the physical path through which the data subject to transmission should be transmitted, based on the above-described "rwnd", "cwnd", and "amount of data transmitted in a unit time", and to notify, to the SCTP layer, the determined stream and the physical path.

Such an urgency flag is a flag indicting whether the data subject to transmission forms a message that requires urgency.

Figure 4:
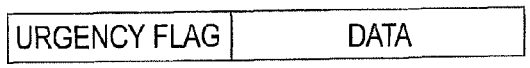
FIG. 4 is a diagram illustrating information transmitted from the ULP layer of each node to the SCTP layer in the mobile communication system according to the first embodiment of the present invention.
Figure 4:
Figure 4:

As illustrated in FIG. 4, the ULP layer of the transmission-side node A is configured to determine an "association ID", a "buffer address", a "byte count", a "context", a "stream ID", a "life time", a "destination transport address", an "unordered flag", a "no bundle flag", a "PPI", etc., and to notify, to the SCTP layer, the determination.

In this case, the "stream ID" is identification information of the stream through which the above-described data subject to transmission should be transmitted, and the "destination transport address" is identification information of the physical path through which the above-described data subject to transmission should be transmitted.

The "life time" indicates a survival time of the above-described data subject to transmission.

For example, when the urgency flag is included in the above-described data subject to transmission, then the ULP layer of the transmission-side node A may be configured to determine a stream and a physical path that have the largest resource available, as the stream and the physical path through which the data subject to transmission should be transmitted.

When the urgency flag is included in the above-described data subject to transmission, then the ULP layer of the transmission-side node A may be configured to determine, as the "life time", the smallest settable survival time.

In this case, the SCTP layer of the transmission-side node A may be configured to preferentially transmit the data subject to transmission having the smallest survival time (life time), out of the data subject to transmission received from the ULP layer of the transmission-side node A.

Moreover, the ULP layer of the transmission-side node A is configured to acquire a "flightsize (fourth data amount)" indicating an amount of data which has been transmitted through each of the physical paths but of which the transmission confirmation information has not yet been received.

In this case, the ULP layer of the transmission-side node A may be configured to calculate the "flightsize" by itself, to acquire the "flightsize" from the SCTP layer of the transmission-side node A, or to calculate it from a combination thereof.

Figure 5:
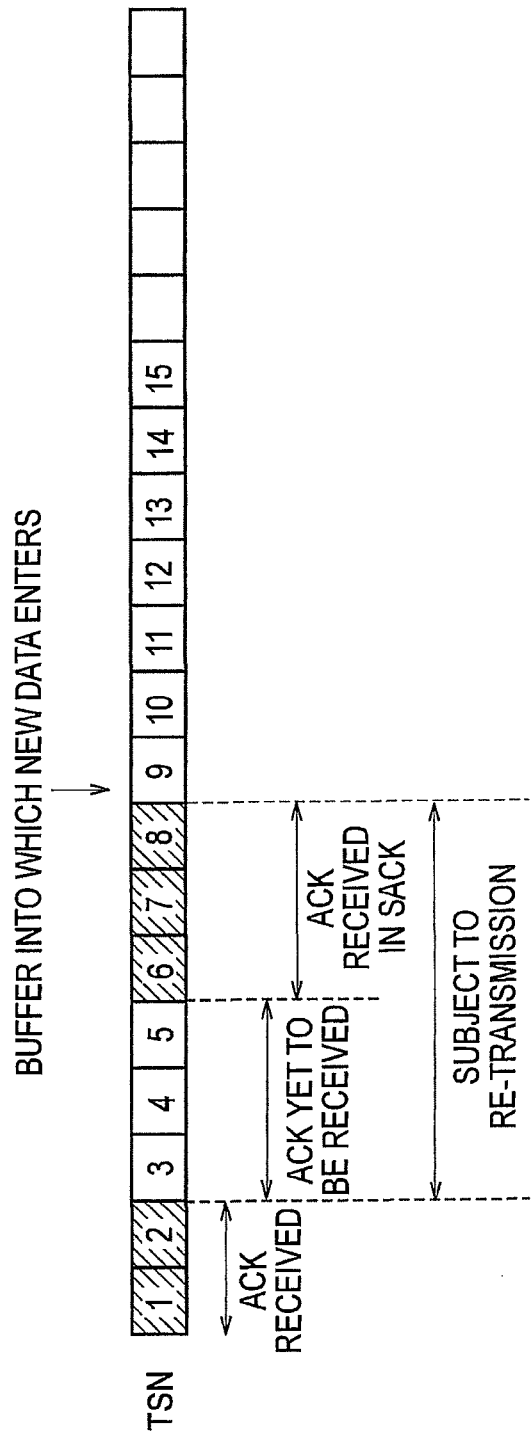
FIG. 5 is a diagram explaining an operation of the SCTP layer of each node in the mobile communication system according to the first embodiment of the present invention.

In an example of FIG. 5, the transmission-side node A has received positive transmission confirmation information (ACK) for data #1 and #2 and received positive transmission confirmation information (ACK in SACK) for data #6 through #8; however, the transmission-side node A has not received positive transmission confirmation information (ACK) for data #3 through #5.

Therefore, in such a situation, the data #3 through #8 are the above-described data subject to transmission. The data #3 through #5 are data which have been transmitted through each of the physical paths but of which the transmission confirmation information has not yet been received, and are data subject to counting the fourth data amount.

(Operation of the Mobile Communication System According to the First Embodiment of the Present Invention)

Hereinafter, with reference to FIG. 6, an operation of the ULP layer of the transmission-side node A when the "Multihoming" is applied in the mobile communication system according to this embodiment will be explained.

Figure 6:
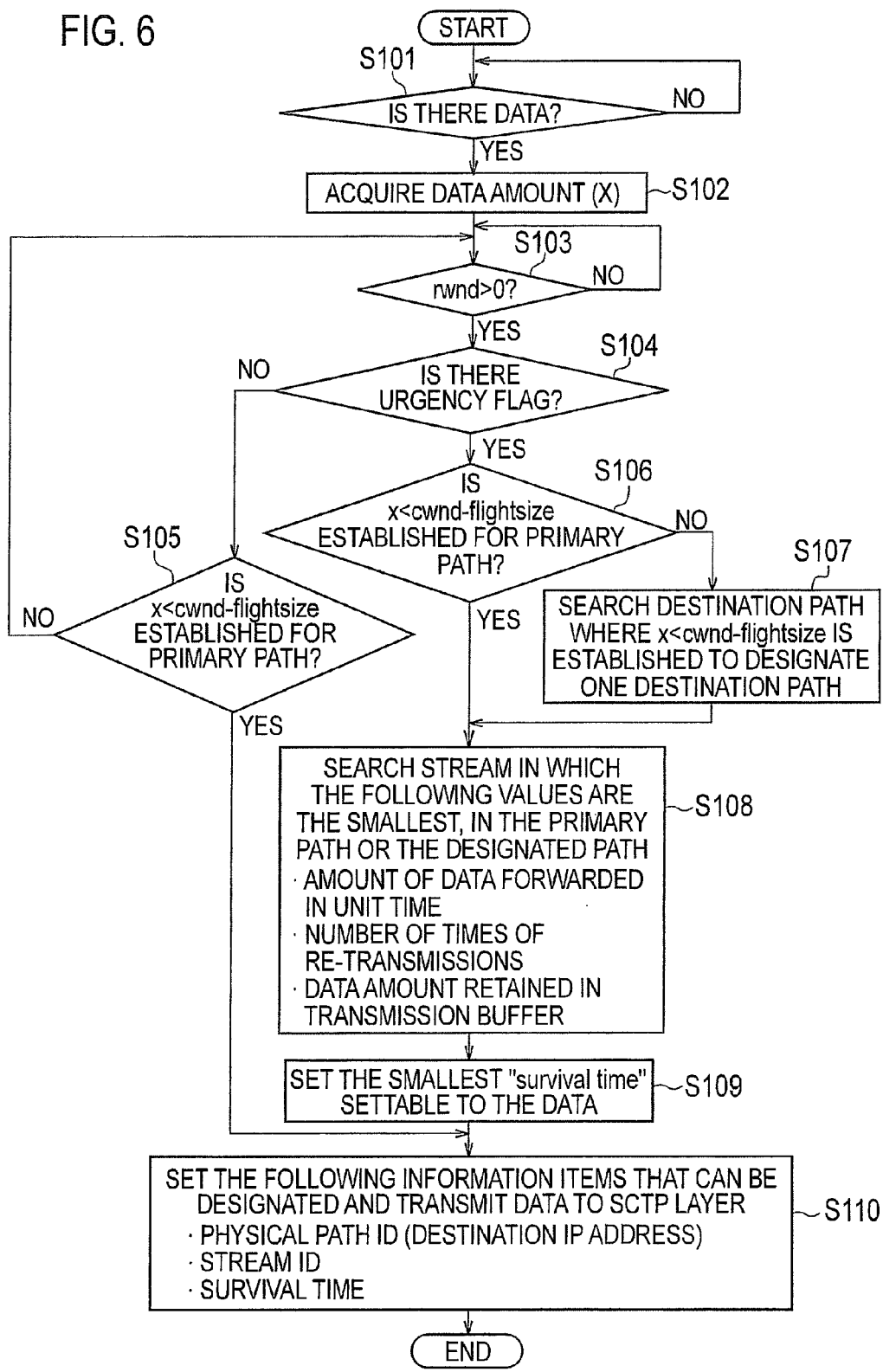
FIG. 6 is a flowchart explaining an operation of the ULP layer of each node in the mobile communication system according to the first embodiment of the present invention.

As illustrated in FIG. 6, if the ULP layer of the transmission-side node A receives the data subject to transmission from the AP layer of the transmission-side node A in step S101, the ULP layer calculates an amount x of the data subject to transmission in step S102.

In step S103, the ULP layer of the transmission-side node A determines whether or not the "rwnd" is greater than "0". In this case, the ULP layer of the transmission-side node A is to regularly acquire the "rwnd" from the SCTP layer of the transmission-side node A.

If it is determined that the "rwnd" is greater than "0", then the operation proceeds to step S104, and if it is not determined that the "rwnd" is greater than "0", then the process in step S103 is repeated.

In step S104, the ULP layer of the transmission-side node A determines whether or not the "urgency flag" is included in the data subject to transmission.

If it is determined that the "urgency flag" is included, the operation proceeds to step S106, and if it is determined that the "urgency flag" is not included, the operation proceeds to step S105.

In step S105, the ULP layer of the transmission-side node A determines, regarding the primary path in the "SCTP Association" established with the reception-side node Z, whether or not the amount x of the data subject to transmission is smaller than a value obtained by subtracting the "flightsize" from the "cwnd" in the primary path, i.e., whether or not "x<cwnd−flightsize" can be established. In this case, the ULP layer of the transmission-side node A is to regularly acquire the "cwnd" from the SCTP layer of the transmission-side node A.

If "YES" is established in step S105, then the operation proceeds to step S110, and if "NO" is established in step S105, the operation returns to step S103.

In step S106, the ULP layer of the transmission-side node A determines, regarding the above-described primary path, whether or not the amount x of the data subject to transmission is smaller than the value obtained by subtracting the "flightsize" from the "cwnd" in the primary path, i.e., whether or not "x<cwnd−flightsize" can be established.

If "YES" is established in step S106, then the operation proceeds to step S108, and if "NO" is established in step S106, the operation proceeds to step S107.

If the amount x of the data subject to transmission is not smaller than the value obtained by subtracting the "flightsize" from the "cwnd" in the primary path, then in step S107, the ULP layer of the transmission-side node A searches physical paths of which the amount x of the data subject to transmission is smaller than the value obtained by subtracting the "flightsize" from the "cwnd" and designates one physical path from the searched physical paths.

In step S108, the ULP layer of the transmission-side node A determines the stream having the smallest "amount of data transmitted in a unit time", the smallest number of times of re-transmissions, or the smallest amount to be retained in a transmission buffer, as the stream through which the data subject to transmission should be transmitted.

Moreover, the ULP layer of the transmission-side node A determines the primary path or the path designated in step S107, as the physical path through which the data subject to transmission should be transmitted.

In this case, the ULP layer of the transmission-side node A is to regularly acquire the "amount of data forwarded in a unit time", the number of times of re-transmissions, or the amount to be retained in a transmission buffer, from the SCTP layer of the transmission-side node A.

In step S109, the ULP layer of the transmission-side node A sets the smallest settable "survival time (life time)" to the data subject to transmission.

In step S110, the ULP layer of the transmission-side node A notifies, the SCTP layer of the transmission-side node A, the physical path ID, the stream ID, and the survival time. In this case, the SCTP layer of the transmission-side node A transmits the data subject to transmission, based on the notified physical path ID, stream ID, and survival time.

(Operation and Effect of the Mobile Communication System According to the First Embodiment of the Present Invention)

According to the embodiment-based mobile communication system, it is possible for the ULP layer of the transmission-side node A to perform a preferential process on the data in which a "priority flag" is included, based on information (the "rwnd", the "cwnd", the "amount of data transmitted in a unit time", etc.) acquired from the SCTP layer of the transmission-side node A.

The operation of the above-described node may be implemented by a hardware, may also be implemented by a software module executed by a processor, and may further be implemented by the combination of the both.

The software module may be arranged in a storing medium of an arbitrary format such as RAM (Random Access Memory), a flash memory, ROM (Read Only Memory), EPROM (Erasable Programmable ROM), EEPROM (Electronically Erasable and Programmable ROM), a register, a hard disk, a removable disk, and CD-ROM.

Such a storing medium is connected to the processor so that the processor can write and read information into and from the storing medium. Such a storing medium may also be accumulated in the processor. Such a storing medium and processor may be arranged in ASIC. Such ASIC may be arranged in the node. As a discrete component, such a storing medium and processor may be arranged in the node.

Thus, the present invention has been explained in detail by using the above-described embodiments; however, it is obvious that for persons skilled in the art, the present invention is not limited to the embodiments explained herein. The present invention can be implemented as a corrected, modified mode without departing from the gist and the scope of the present invention defined by the claims. Therefore, the description of the specification is intended for explaining the example only and does not impose any limited meaning to the present invention.

The invention claimed is:

1. A mobile communication system comprising a reception-side node and a transmission-side node, the transmission-side node further comprising a processor and a memory:
   wherein a communication is configured to be performed between the reception-side node and the transmission-side node by a first protocol layer and a second protocol layer that is a lower layer of the first protocol layer,
   wherein the transmission-side node includes one or a plurality of transmission-side IP addresses,
   wherein the reception-side node includes one or a plurality of reception-side IP addresses,
   wherein a connection of the second protocol layer formed by a plurality of physical paths is configured to be set between the transmission-side node and the reception-side node,
   wherein the plurality of physical paths are configured to be set by each of the transmission-side IP addresses and each of the reception-side IP addresses,
   wherein one or a plurality of streams are configured to be set within the connection of the second protocol layer set between the transmission-side node and the reception-side node,
   wherein the first protocol layer of the transmission-side node is configured to acquire, from the second protocol layer of the transmission-side node, a first data amount indicting an amount of data that can be received at the reception-side node for each connection of the second protocol layer, a second data amount indicating an amount of data that can be transmitted by the transmission-side node for each physical path, and a third data amount indicating an amount of data transmitted within a unit time by the transmission-side node for each stream,
   and wherein, when an urgency flag is included in data subject to transmission, the first protocol layer of the transmission-side node is configured to determine a stream and a physical path through which the data subject to transmission should be transmitted, based on the first data amount, the second data amount, and the third data amount, and to notify, to the second protocol layer of the transmission-side node, the determination.

2. The mobile communication system according to claim 1, wherein one primary path is configured to be set in the plurality of physical paths included in each of the connections of the second protocol layer,
wherein the first protocol layer of the transmission-side node is configured to acquire a fourth data amount indicating an amount of data which has been transmitted through each of the physical paths but of which the transmission confirmation information has not been yet received,
and wherein, when the amount of the data subject to transmission is smaller than a value obtained by subtracting the fourth data amount from the second data amount in the primary path, the first protocol layer of the transmission-side node is configured to search a stream having the smallest third data amount, number of times of re-transmissions, or amount to be retained in a transmission buffer, to determine the searched stream and primary path as the stream and the physical path through which the data subject to transmission should be transmitted, and to notify, to the second protocol layer of the transmission-side node, the determination.

3. The mobile communication system according to claim 1, wherein, when the amount of the data subject to transmission is not smaller than a value obtained by subtracting the fourth data amount from the second data amount in the primary path, the first protocol layer of the transmission-side node is configured to search a physical path in which the amount of the data subject to transmission is smaller than a value obtained by subtracting the fourth data amount from the second data amount, and to search a stream having the smallest third data amount, number of times of re-transmissions, or amount to be retained in a transmission buffer,
and wherein the first protocol layer of the transmission-side node is configured to determine the searched stream and physical path as the stream and the physical path through which the data subject to transmission should be transmitted, and to notify, to the second protocol layer, the determination.

4. The mobile communication system according to claim 1, wherein when an urgency flag is included in the data subject to transmission, the first protocol layer of the transmission-side node is configured to determine a survival time of the data subject to transmission, together with the stream and the physical path through which the data subject to transmission should be transmitted, based on the first data amount, the second data amount, and the third data amount, and to notify, to the second protocol layer, the determination.

5. The mobile communication system according to claim 4, wherein the second protocol layer of the transmission-side node is configured to preferentially transmit data subject to transmission having the shortest survival time, out of the data subject to transmission received from the first protocol layer of the transmission-side node.

6. A transmission-side node comprising a processor and a memory in which a communication is configured to be performed between the transmission-side node and a reception-side node having one or a plurality of reception-side IP addresses by a first protocol layer and a second protocol layer that is a lower layer of the first protocol layer,
wherein the transmission-side node includes one or a plurality of transmission-side IP addresses,
wherein a connection of the second protocol layer formed by a plurality of physical paths is configured to be set between the transmission-side node and the reception-side node,
wherein the plurality of physical paths are configured to be set by each of the transmission-side IP addresses and each of the reception-side IP addresses,
wherein one or a plurality of streams are configured to be set within the connection of the second protocol layer,
wherein the first protocol layer is configured to acquire, from the second protocol layer, a first data amount indicting an amount of data that can be received at the reception-side node for each connection of the second protocol layer, a second data amount indicating an amount of data that can be transmitted by the transmission-side node for each physical path, and a third data amount indicating an amount of data transmitted within a unit time by the transmission-side node for each stream,
and wherein when an urgency flag is included in data subject to transmission, the first protocol layer is configured to determine a stream and a physical path through which the data subject to transmission should be transmitted, based on the first data amount, the second data amount, and the third data amount, and to notify, to the second protocol layer of the transmission-side node, the determination.

7. The transmission-side node according to claim 6, wherein one primary path is configured to be set in the plurality of physical paths included in each of the connections of the second protocol layer,
wherein the first protocol layer is configured to acquire a fourth data amount indicating an amount of data which has been transmitted through each of the physical paths but of which the transmission confirmation information has not been yet received,
and wherein when the amount of the data subject to transmission is smaller than a value obtained by subtracting the fourth data amount from the second data amount in the primary path, the first protocol layer is configured to search, within the primary path, a stream having the smallest third data amount, number of times of re-transmissions, or amount to be retained in a transmission buffer, to determine the searched stream and primary path as the stream and the physical path through which the data subject to transmission should be transmitted, and to notify, to the second protocol layer, the determination.

8. The transmission-side node according to claim 6, wherein when the amount of the data subject to transmission is not smaller than a value obtained by subtracting the fourth data amount from the second data amount in the primary path, the first protocol layer is configured to search a physical path in which the amount of the data subject to transmission is smaller than a value obtained by subtracting the fourth data amount from the second data amount, and to search a stream having the smallest third data amount, number of times of retransmissions, or amount to be retained in a transmission buffer, and wherein the first protocol layer is configured to determine the searched stream and physical path as the stream and the physical path through which the data subject to transmission should be transmitted, and to notify, to the second protocol layer, the determination.

9. The transmission-side node according to claim 6, wherein when an urgency flag is included in the data subject to transmission, the first protocol layer is configured to determine a survival time of the data subject to transmission, together with the stream and the physical path through which the data subject to transmission should be transmitted, based on the first data amount, the second data amount, and the third data amount, and to notify, to the second protocol layer, the determination.

10. The transmission-side node according to claim 9, wherein the second protocol layer is configured to preferentially transmit data subject to transmission having the shortest survival time, out of the data subject to transmission received from the first protocol layer.

* * * * *